United States Patent
Soulier et al.

(10) Patent No.: US 8,342,770 B2
(45) Date of Patent: Jan. 1, 2013

(54) COUPLING DEVICE INTENDED TO CONNECT FIRST AND SECOND ELEMENTS WHICH ARE HINGED WITH RESPECT TO ONE ANOTHER

(75) Inventors: Pascal-Marie Paul Marcel Soulier, Le Havre (FR); Aurélie De Sorbay, Le Havre (FR)

(73) Assignee: Aircelle, Gonfreville l'Orcher ( * ) Notice: Subject to any disclaimer, the term of this patent is extended or adjusted under 35 U.S.C. 154(b) by 261 days.

(21) Appl. No.: 12/673,865

(22) PCT Filed: Aug. 6, 2008

(86) PCT No.: PCT/EP2008/060348
§ 371 (c)(1),
(2), (4) Date: Feb. 17, 2010

(87) PCT Pub. No.: WO2009/024470
PCT Pub. Date: Feb. 26, 2009

(65) Prior Publication Data
US 2011/0110705 A1    May 12, 2011

(30) Foreign Application Priority Data

Aug. 20, 2007 (FR) ...................... 07 05935

(51) Int. Cl.
*F16C 11/06* (2006.01)
*E01F 9/018* (2006.01)
*F16C 11/00* (2006.01)
(52) U.S. Cl. .............................. 403/150; 403/2; 403/79

(58) Field of Classification Search ................ 403/2, 79, 403/398, 145, 150, 151, 152, 154; 244/53 R, 244/54, 129.1, 129.4
See application file for complete search history.

(56) References Cited

U.S. PATENT DOCUMENTS 3,922,104 A * 11/1975 McCullough ...................... 403/2
4,786,202 A * 11/1988 Arnold et al. ................... 403/79
4,808,023 A * 2/1989 Arnold et al. ................. 403/157
4,836,485 A * 6/1989 Cooper ....................... 248/278.1
5,470,118 A * 11/1995 Burton ....................... 294/86.18
(Continued)

FOREIGN PATENT DOCUMENTS
FR        2771459         5/1999
(Continued)

OTHER PUBLICATIONS

International Search Report; PCT/EP2008/060348; Sep. 29, 2008.

*Primary Examiner* — Michael P Ferguson
*Assistant Examiner* — Eric Chau
(74) *Attorney, Agent, or Firm* — Brinks Hofer Gilson & Lione

(57) ABSTRACT

Disclosed is a coupling device (1) intended to connect first and second elements which are articulated with respect to one another, wherein the device includes a compression element (2) designed to allow a compressive force to pass from one element to another in a first state, and a tension element (3) designed to allow a tensile force to pass from one element to another in a second state, the compression element additionally forming a substitution tension element designed to allow a tensile force to pass from one element to another in a third state corresponding to the fracturing of the tension element.

1 Claim, 3 Drawing Sheets

U.S. PATENT DOCUMENTS

| | | | | |
|---|---|---|---|---|
| 6,007,267 | A | * | 12/1999 | VanHorn ............................ 403/2 |
| 6,227,485 | B1 | * | 5/2001 | Porte ................................ 244/54 |
| 6,334,730 | B1 | * | 1/2002 | Porte ............................ 403/104 |
| 6,622,963 | B1 | * | 9/2003 | Ahrendt et al. ................. 244/54 |
| 6,869,046 | B2 | * | 3/2005 | McEvoy ......................... 244/54 |
| 7,093,996 | B2 | * | 8/2006 | Wallace et al. ................. 403/78 |

FOREIGN PATENT DOCUMENTS

| | | |
|---|---|---|
| FR | 2771710 | 6/1999 |
| FR | 2830842 | 4/2003 |

* cited by examiner

COUPLING DEVICE INTENDED TO CONNECT FIRST AND SECOND ELEMENTS WHICH ARE HINGED WITH RESPECT TO ONE ANOTHER

TECHNICAL FIELD

The invention relates to a coupling device intended to connect first and second elements which are hinged with respect to one another.

The invention applies more particularly to fields in which the hinged elements are subjected to external stresses, the coupling device then being subjected consecutively to compressive stresses and tensile stresses, thus causing fatigue phenomena in the constituent elements of the coupling device.

BACKGROUND

A coupling device is used for example in aeronautics, and in particular is used on nacelles.

A nacelle is a cowl element for protecting an aircraft engine. A nacelle usually has two elements hinged to the pylon of the aircraft in such a way as to allow access to the engine housed inside the nacelle.

Latches are provided at the meeting lines between the two hinged elements, at the bottom, that is at 6 o'clock, and at the top, that is at 12 o'clock, to prevent the nacelle coming open in flight.

It is known practice to use latches comprising a coupling device having a rod which is subjected to both compressive and tensile stresses, thus causing fatigue phenomena.

The fatigued rod is severely weakened and therefore, for safety reasons, it has to be made significantly larger than would otherwise be the case, and/or an additional rod must be provided as a fallback in case the aforementioned rod breaks. Such a coupling device is heavy, expensive and large.

BRIEF SUMMARY

A coupling device is provided to connect first and second elements which are hinged with respect to one another, characterized in that it comprises a compression element designed to transmit a compressive load from one element to another in a first condition, and a tension element designed to transmit a tensile load from one element to another in a second condition, the compression element also forming a substitute tension element designed to transmit a tensile load from one element to another in a third condition corresponding to breakage of the tension element.

Fatigue occurs when an element is frequently subjected to tensile stresses, which then create a crack which tends to propagate as the tensile stresses repeat.

The compression element is not under any tensile stress and is therefore not subject to fatigue.

The coupling device according to the invention thus provides for the load a strong pathway created by the compression element, which is able to perform the same function as the tension element in the event of failure of the latter.

The tension element can thus be made smaller.

Advantageously, the compression element comprises a first rod, the tension element comprising a second rod, each rod being provided with a first end and a second end, these being provided with hinge means on the first and second hinged elements, respectively.

In accordance with one feature of the invention, the second rod is housed inside the first rod.

This feature allows the coupling device to be made more compact.

Each rod preferably has an elongate opening in the vicinity of at least one end, the elongate opening being intended for the passage of a hinge pin connecting the coupling device to the corresponding element.

The elongate openings enable the device to accept a small amount of movement between the rods and the hinge pins connected to the corresponding hinged elements. They also enable misalignment between one half shell and the other to be compensated for so that they can be latched together.

In accordance with one possibility of the invention, the elongate openings are arranged in such a way that in the first condition the first rod is in abutment against the hinge pin while the second rod is set back from it, and that in the second condition the second rod is in abutment against the hinge pin while the first rod is set back from it.

In this way, in the first condition the first rod is subjected to compressive stresses only, while the second rod is not subjected to any particular stress, and in the second condition the second rod is subjected to tensile stresses only, while the first rod is not subjected to any particular stress.

The invention also relates to a nacelle having first and second elements which are hinged with respect to one another, characterized in that the hinged elements are connected by at least one coupling device according to the invention.

The invention also relates to an aircraft characterized in that it has at least one nacelle according to the invention.

BRIEF DESCRIPTION OF THE DRAWINGS

However, the invention will be understood clearly from the description which follows with reference to the accompanying schematic drawing illustrating, by way of example, an embodiment of this coupling device.

DETAILED DESCRIPTION

Figure 1:
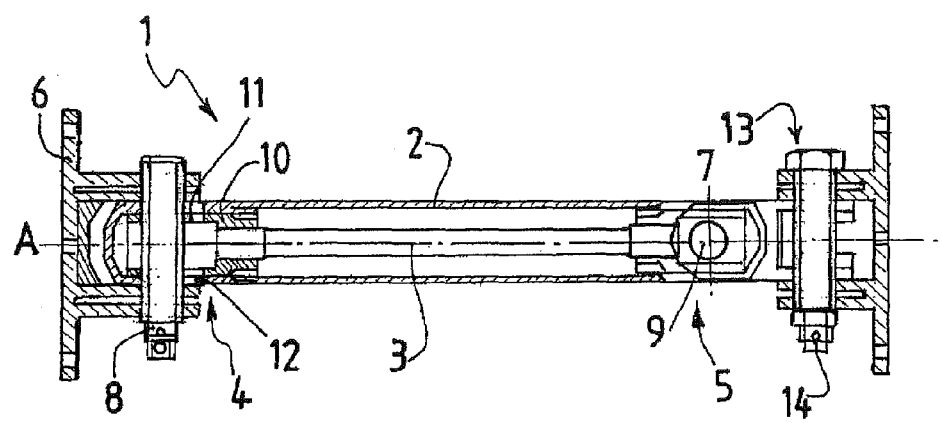
FIG. 1 is a view of this device in longitudinal section, in a first condition.

FIG. 1 shows a coupling device 1 comprising a first rod 2 of tubular general shape and a second rod 3 of cylindrical general shape, the latter extending inside the first rod 2 along an axis A.

Each rod 2, 3 has a first end 4 and a second end 5 connected to a first yoke 6 and to a second yoke 7, respectively, the latter being fixed to a first movable element and a second movable element (not shown) of a nacelle through a first hinge pin 8 and a second hinge pin 9. The pin 9 is perpendicular to the pin 8.

More precisely, the second ends of the rods 2, 3 are connected to a universal joint 13 of which the yoke 7 is a part and which has a hinge pin 14 parallel to the pin 8.

The first end 4 of the second rod 3 has a yoke 10 hinged to the first hinge pin 8, the yoke 10 having two mutually opposite elongate holes 11.

The first end 4 of the first rod 2 also has two mutually opposite elongate holes 12 in which the first hinge pin 8 sits.

Figure 2:
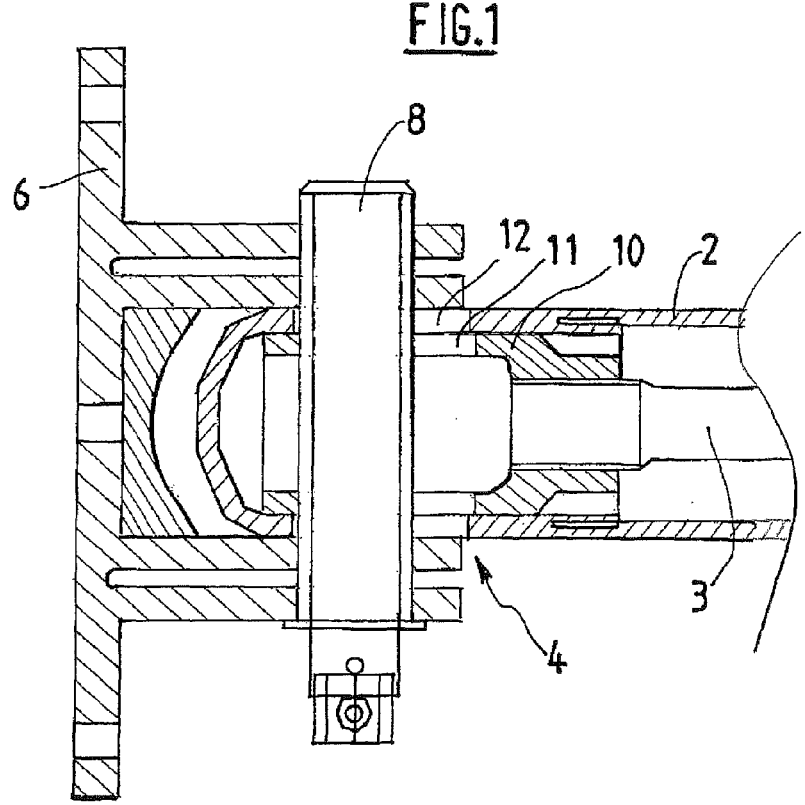
FIG. 2 is an enlarged view of one end of the coupling device seen in FIG. 1.

The elongate holes 11, 12 are approximately the same length and are arranged at an angle relative to each other in such a way that, in a first or tensile condition of the coupling device, shown in FIGS. 1 and 2, the second rod 3 butts against the first hinge pin 8 via the outward parts of the elongate holes 11, while the first rod 2 is set back from the aforementioned pin 8.

In this way, in the first or tensile condition, only the second rod 3 is subjected to tensile stresses, while the first rod 2 is under no particular stress.

Figure 3:
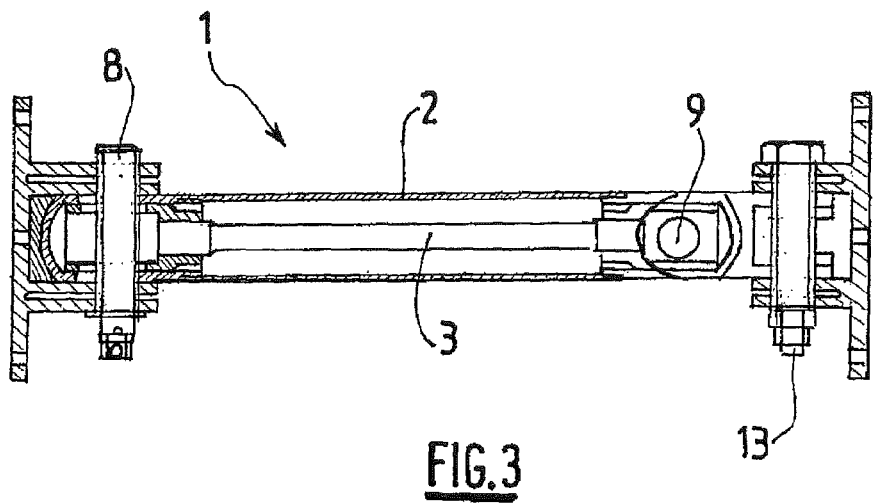
FIGS. 3 and 4 are views corresponding to FIGS. 1 and 2, respectively, of the coupling device in a second condition.
Figure 4:
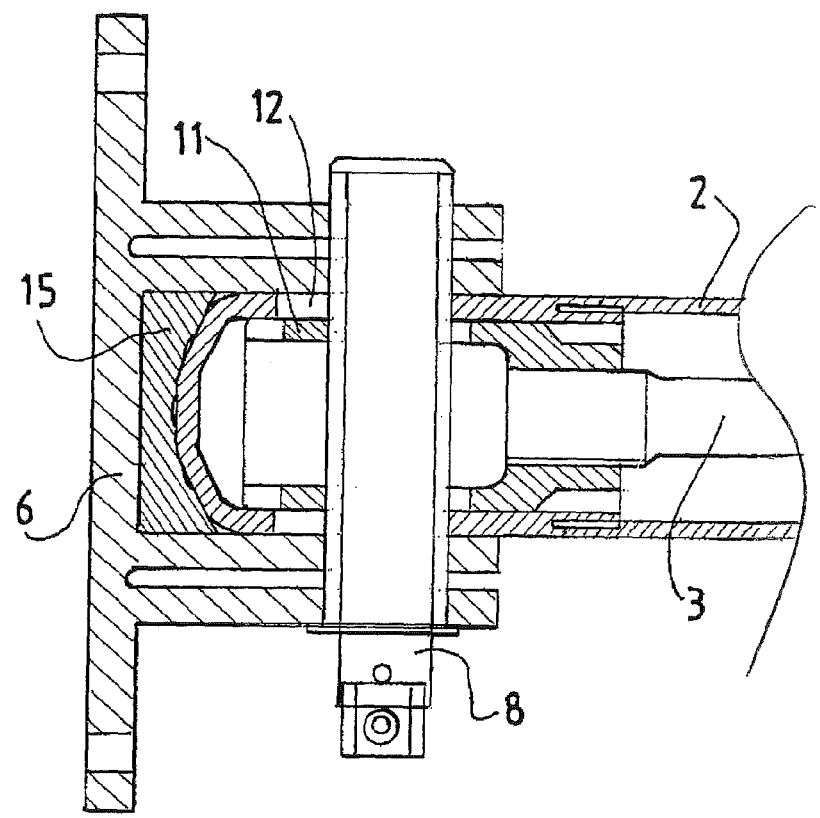

FIGS. 3 and 4 show the coupling device 1 in a second condition corresponding to a compressive condition of the device.

In this second or compressive condition, the first rod 2 is in abutment against the first hinge pin 8, via the inward parts of the elongate holes 12, while the second rod 3 is set back from the aforementioned pin 8. Depending on the sizes of the various elements, the first rod 2 can also butt against a concave face 15 of the yoke 6, or butt against both the face 15 and against the pin 8.

If the first rod 2 does not butt against the pin 8, the latter can be lightened by designing its dimensions solely for successive tensile stresses rather than for alternating tensile and compressive stresses.

Thus, only the first rod 2 is subjected to compressive stresses, and the second rod 3 is under no particular stress.

In normal operation, the device is subjected to one of the two aforementioned conditions, so that neither of the rods 2, 3 is subjected to both compression and tension. The rods 2, 3 do not therefore experience fatigue phenomena, which occur when recurring tensile stresses are applied or when compressive stresses alternate with tensile stresses.

Figure 5:
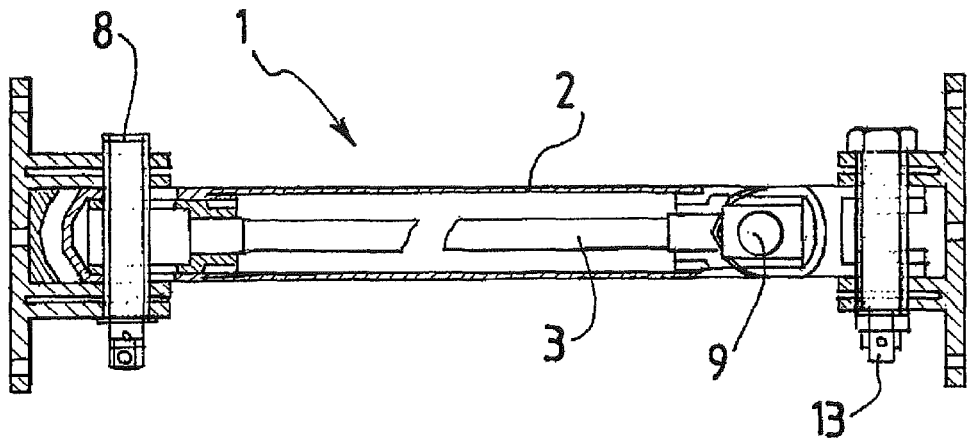
FIGS. 5 and 6 are views corresponding to FIGS. 1 and 2, respectively, of the coupling device in a third condition.
Figure 6:
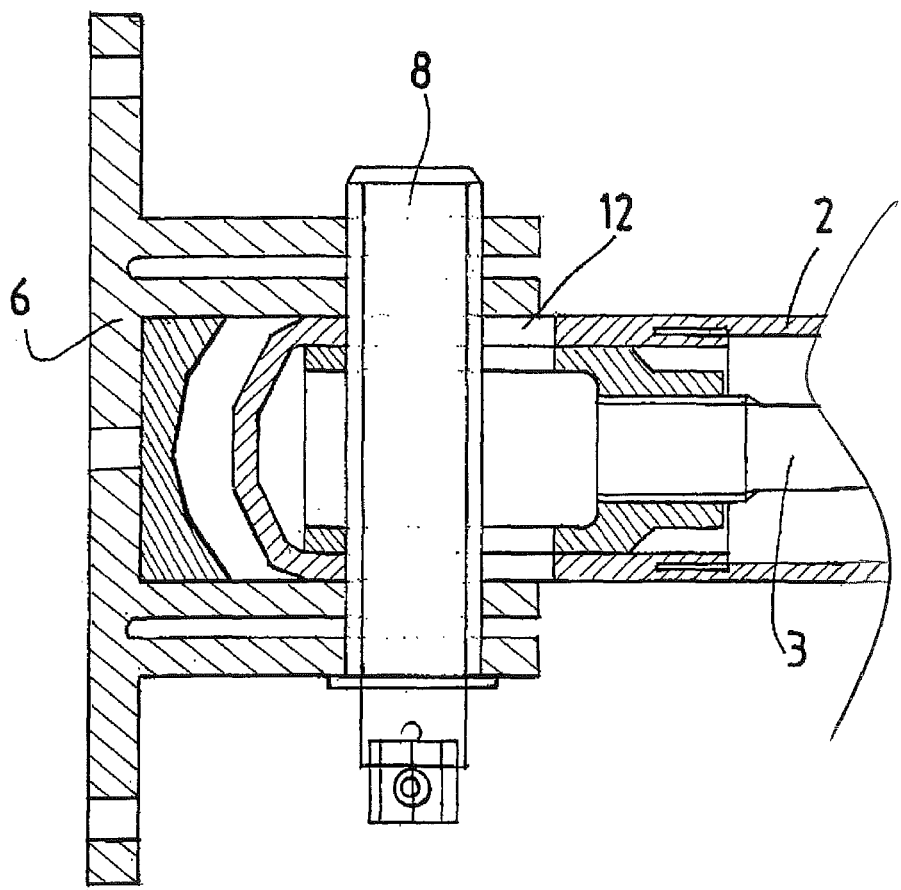

FIGS. 5 and 6 show a third condition of the coupling device 1 corresponding to an accidental operation, specifically breakage of the second rod 3.

As illustrated more particularly in FIG. 6, the first rod 2, which is suitable for transmitting compressive loads between the two hinged elements of the nacelle, is also suitable for transmitting tensile loads should the second rod 3 break. What happens is that, in the event of a breakage and when tension is applied to the coupling device 1, the first rod 2 butts against the first hinge pin 8, via the outward parts of the elongate holes 12. The first rod 2 thus forms a pathway for the tensile loads.

In the same way, by the same principle, the second rod 3, which is suitable for transmitting tensile loads between the two hinged elements of the nacelle, is also suitable for transmitting compressive loads in the event of breakage of the first rod 2.

It goes without saying that the invention is not limited to the embodiment of this coupling device described above by way of example, but that on the contrary it encompasses all variants. For example, such a device could be used in fields of application other than nacelles.

The invention claimed is:

1. A coupling device for connecting first and second elements which are hinged with respect to one another, the coupling device comprising:
   a tubular compression rod, configured to transmit a compressive load between the first and second elements, defining a compressive condition of the coupling device, and
   a tension rod coaxially housed within the tubular compression rod, the tension rod configured to transmit a tensile load between the first and second elements, defining a tensile condition of the coupling device,
   wherein each rod is provided with opposing first and second ends, each of the first and second ends of each rod being provided with a respective opening forming a transverse through hole in each end of the rod, wherein the through holes on adjacent ends of the compression and tension rods partially align, and a hinge pin passes through each respective set of aligned through holes at adjacent first and second ends such that ends of each hinge pin are receivable by a respective hinge yoke of the first and second elements, allowing pivoting motion of the compression rod and tension rod around each hinge yoke of the first and second elements,
   wherein the openings, at the adjacent ends of the compression and tension rods, are elongated and axially offset along the compression and tension rods such that in the compressive condition a radial edge of the elongate opening in the compression rod is in abutment against the respective one of the hinge pins while a radial edge of the elongate opening in the tension rod is set back from the respective hinge pin, and in the tensile condition the radial edge of the elongate opening in the tension rod is in abutment against the respective hinge pin while the radial edge of the elongate opening in the compression rod is set back from the respective hinge pin; and
   wherein the compression rod forms a substitute tension element configured to additionally transmit the tensile load between the first and second elements upon breakage of the tension element, defining a breakage condition of the coupling device.

* * * * *